Figure 1:
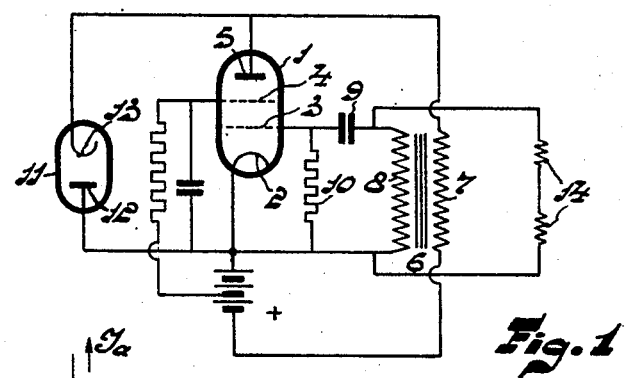

June 20, 1950

J. HAANTJES ET AL 2,512,543

CIRCUIT ARRANGEMENT FOR PRODUCING
SAWTOOTH-LIKE CURRENTS

Filed March 11, 1947

2 Sheets-Sheet 1

J. HAANTJES & J.J.P. VALETON
INVENTORS
BY
ATTORNEY.

June 20, 1950  J. HAANTJES ET AL  2,512,543
CIRCUIT ARRANGEMENT FOR PRODUCING
SAWTOOTH-LIKE CURRENTS Filed March 11, 1947  2 Sheets-Sheet 2

J. HAANTJES & J. J. P. VALETON
INVENTORS

BY
ATTORNEY.

Patented June 20, 1950

2,512,543

UNITED STATES PATENT OFFICE 2,512,543

CIRCUIT ARRANGEMENT FOR PRODUCING SAW-TOOTHLIKE CURRENTS

Johan Haantjes and Josué Jean Philippe Valeton, Eindhoven, Netherlands, assignors to Hartford National Bank and Trust Company, Hartford, Conn., as trustee Application March 11, 1947, Serial No. 733,910
In the Netherlands March 14, 1946

4 Claims. (Cl. 250—36)

For producing saw-tooth currents, such as are used, for example, for deflecting, by magnetic means, cathode rays for television purposes, use is sometimes made of a circuit-arrangement comprising a triode, in which the anode circuit is tightly coupled inductively to the control-grid circuit. In this case the deflecting coils for the device operating with cathode-rays are coupled in a suitable manner to the circuit-arrangement and may, for example, be connected in parallel with the inductance coil included in the control-grid circuit. For synchronizing the saw-tooth currents produced synchronizing pulses may be supplied to the control-grid of the triode.

In order to improve the effect of the aforesaid circuit-arrangement, it has already been proposed to connect a diode in parallel with the triode and in opposite sense, the anode of the diode consequently being connected to the cathode of the triode.

Both circuit-arrangements have, however, a limitation in that the generator of the synchronizing pulses is required to supply a comparatively high proportion of energy, since these pulses are supplied to the control-grid of the triode and a considerable grid current is passed through the triode. This grid current is unavoidable, since in the triode a distribution of the flow of electrons about the anode circuit and the grid circuit occurs, so that during that part of the sweep of the saw-tooth current, in which the anode voltage of the triode is low owing to the voltage drop across the inductance coil included in the anode circuit, a sufficient flow of electrons is nevertheless available to enable the supply of the high anode current occurring. For this purpose a positive voltage is induced in the control-grid circuit, so that the total control voltage across the triode always brings about an adequate flow of electrons.

In the circuit-arrangement according to the invention which also comprises a discharge tube, in which a circuit connected in parallel with the anode circuit of this tube includes a diode in such manner that the anode of the diode is connected to the cathode of the discharge tube and in which circuit-arrangement the anode circuit of the discharge tube is inductively coupled to the control-grid circuit of this tube, the aforesaid difficulties with regard to the supply of synchronizing pulses are obviated, since the discharge tube comprises a screen-grid and the control-grid circuit of this tube includes a grid condenser and a grid leak resistance, in such manner that grid current does not occur to any appreciable extent and the time constant of these two elements exceeds the period of the saw-tooth current.

In this circuit-arrangement the required distribution of the electron flow of the discharge tube occurs between the anode circuit and the screen-grid circuit. The grid condenser and the grid leak resistance prevent the occurrence of grid currents.

In order that the invention may be more clearly understood and readily carried into effect, it will now be explained more fully with reference to Figs. 1 and 2 of the accompanying drawing.

Discharge tube 1 is a screen-grid tube comprising a cathode 2, a control-grid 3, a screen-grid 4, and an anode 5. The coupling between the anode circuit and the control-grid circuit is effected by windings 7 and 8 of a coupling transformer 6 included in these circuits respectively. The control-grid circuit comprises a grid condenser 9 and a grid leak resistance 10. Connected in parallel with the anode circuit of discharge tube 1 is a diode 11, of which anode 12 is connected to cathode 2 of tube 1 and of which cathode 13 is connected to anode 5. Deflecting coils 14 for deflecting the cathode-rays of a television device are connected in parallel with the secondary winding 8 of coupling transformer 6 included in the control-grid circuit.

Fig. 2a illustrates the variation of the current $I_a$ in the inductance coil 7 in the anode circuit as a function of time $t$, whereas Fig. 2b illustrates the voltage $V_8$ induced in the coil 8 and Fig. 2c the corresponding control-grid voltage $e_g$ as a function of time.

From the moment $t_0$ the anode current of the tube increases linearly with time, whilst the voltage across coil 7, similar to that across coil 8, is constant. Owing to the presence of the condenser 9 and the leak resistance 10 the voltage set up at the control-grid is substantially zero.

Owing to the increase in impedance of the discharge tube, the increase in anode current will be cut down at a certain moment of time, due to which the negative feedback phenomenon becomes active and the discharge tube is blocked. At the moment $t$, which is prior to the spontaneous occurrence of this phenomenon, a negative synchronizing pulse, assuming the use of synchronisation, is supplied to the control-grid, owing to which tube 1 is blocked. This will result in free oscillations being set up in the circuit formed by coil 7 and, connected in parallel therewith, the natural capacity of this coil, which is always present, the current passing, during the first half period, from the maximum value at $t_1$ through zero to an oppositely maximum value at $t_2$. The voltage across coil 7 has, in the meantime, changed its polarity and has reached a maximum value when the current passes through zero, after which the voltage has dropped and has changed its polarity a short time before the moment of time $t_2$ and then reaches a value at which the diode 11 allows current to pass said current being then passed through the diode in the manner shown between $t_2$ and $t_3$.

During the lapse of time from $t_1$ to $t_2$, the voltage across coil 8 shown in Fig. 2b is subjected to alterations of a polarity opposite to that of the alteration across coil 7. The values of the grid condenser 9 and the grid leak resistance 10 are such that the voltage pulse set up across the coil 8 between $t_1$ and $t_2$ also produces a negative voltage pulse across the control-grid, the grid voltage immediately falling back substantially to zero at the end of the pulse owing to the large time constant of the two elements. Hence as in the first case, grid current does not occur to any appreciable extent.

It is obvious that in this circuit-arrangement the time constant of the grid leak resistance together with the grid condenser does not act upon the frequency of the saw-tooth current, so that this time constant may be very large compared with the period of the saw-tooth current, and this assists in the falling back of the grid voltage to substantially zero.

In the aforesaid circuit-arrangement the voltage across the inductance coil 7, during the first part of the sweep and hence between $t_2$ and $t_3$, is equal to the voltage of the anode supply source together with the voltage drop across the diode. During the second part of the sweep, and hence from $t_3$ and $t_4$ for example, the voltage across coil 7 is equal to the voltage of the supply battery less the voltage across the screen-grid tube. In order to ensure an absolutely linear saw-tooth current it is necessary, on the assumption that the charge of the anode circuit is purely inductive, that the voltage across the coil should remain constant during the sweep, since, if the voltage at the beginning of the sweep differs by $p$ per cent from the voltage at the end of the sweep, this difference per se already brings about a deviation of $p$ per cent from the linear variation of the saw-tooth current.

Figure 4:
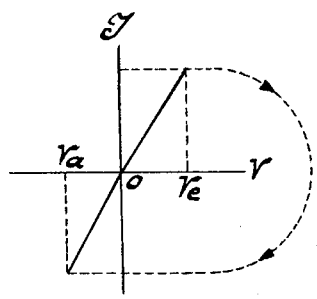

Fig. 4 shows the current-voltage characteristic curve of the combination diode-screen-grid tube. With a positive voltage the screen-grid tube is conductive, the diode, however, is not. With a negative value of the voltage the diode alone is conductive. At the beginning of the sweep the voltage across coil 7 is equal to the battery voltage together with $V_a$, being the voltage drop across the diode, and at the end of the sweep the voltage across the coil is equal to the battery voltage less the voltage drop $V_b$ across the screen-grid tube. Thus, in order to approximate the linearity of the saw-tooth current as far as possible it is desirable to minimise the voltage path from $V_a$ to $V_b$.

According to one embodiment of the circuit-arrangement according to the invention an appreciable improvement in keeping constant the voltage across the coil may be ensured by including in the parallel branch which comprises the diode a section of the primary winding of the coupling transformer, the other part of which serves for the coupling between the anode circuit and the control-grid circuit of the discharge tube.

Figure 2:
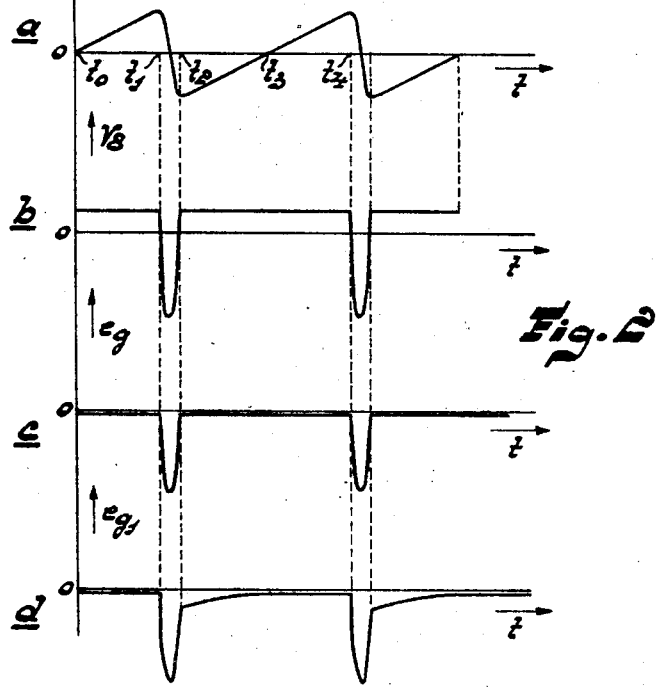
Figure 3:
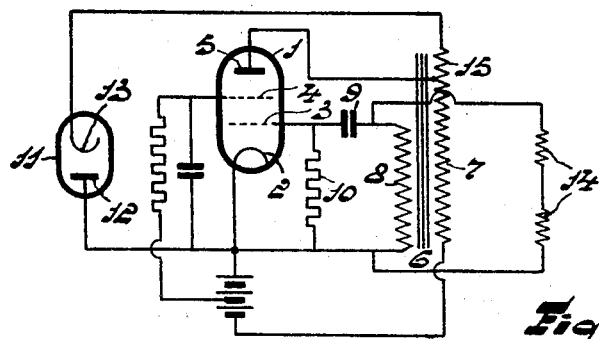

Such a circuit-arrangement is diagrammatically illustrated in Fig. 3, in which the parts corresponding with those of Fig. 1 are designated by corresponding reference numerals. In this circuit-arrangement the primary winding of the coupling transformer 6 consists of two parts, viz. the part 7 and part 15; the latter part being connected between the anode 5 of tube 1 and the cathode 13 of the diode 11.

Figure 5:
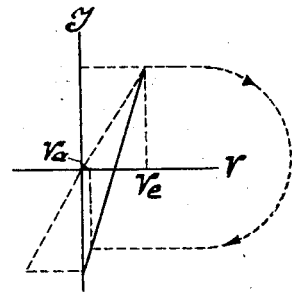

The improvement realized by this circuit-arrangement will be explained more fully with reference to Fig. 5, in which the current in the combination of screen-grid tube and diode is plotted as a function of the anode voltage of the screen-grid tube. The diode and the discharge tube no longer operate entirely alternatively, since when the voltage V of tube 1 is still positive the voltage of the cathode of the diode already becomes negative, so that the diode already allows current to pass. If the anode voltage of the discharge tube is zero, the voltage of the cathode of the diode has already reached a negative value such as to allow a current of adequate amplitude to pass. This results in the current-voltage characteristic curve of the combination of diode and screen-grid tube becoming steeper than the characteristic curve of Fig. 4 again shown in Fig. 5 in dotted lines and the latter follows the full line, so that the points $V_a$ and $V_b$ are caused to be located closer to one another, with the result that an improved approximation of the straight-line relationship of the saw-tooth current is ensured.

The description of the circuit-arrangement shown in Fig. 1 has already revealed that the control-grid voltage $e_g$ of the tube 1, as indicated in Fig. 2c, is substantially zero during practically the entire sweep, consequently from $t_2$ to $t_4$, so that the discharge tube is open during the entire sweep. This gives rise to a high screen-grid current, particularly at the beginning of the sweep, when there is not yet passing anode current to an appreciable extent. For the correct operation of the circuit-arrangement it is, however, not essential that the tube should be open during the beginning of the sweep, whereas not until by the end of the sweep the voltage of the control-grid need be approximately zero.

In a preferred embodiment of the circuit-arrangement according to the invention this unnecessarily high screen-grid current is avoided, since the voltages induced in the control-grid circuit of the discharge tube are supplied to the control-grid via a network which allows the components of these voltages having frequencies exceeding the saw-tooth frequency to pass to a less extent than the components having saw-tooth frequency.

Figure 6:
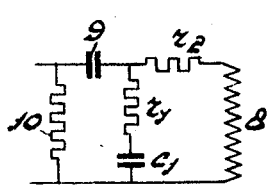
Figure 7:
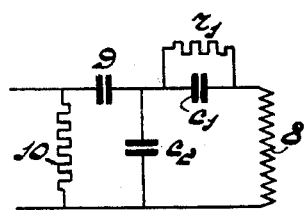
Figure 8:
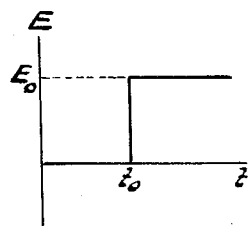
Figure 9:
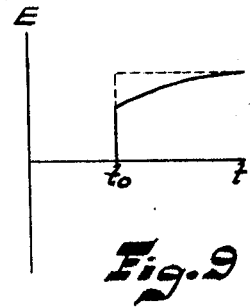

Figs. 6 and 7 show two control-grid circuits comprising networks of this kind and in which 8, 9 and 10 again designate the inductance coil, the grid condenser and the grid leak resistance. In the circuit-arrangement shown in Fig. 6 the supplied oscillations having high frequencies are allowed to pass in the ratio of the resistances $r_1$ and $r_1 + r_2$, whereas for lower frequencies the capacity $C_1$ gets a higher impedance, so that a higher voltage is passed on. The circuit-arrangement shown in Fig. 7 yields a similar result. Both networks have a characteristic response curve as shown in Fig. 9, which means that, if such a network has supplied to it a leap voltage as shown in Fig. 8, which voltage at the moment of time $t_0$ abruptly rises from the value zero to a given constant value $E_0$, the voltage across the output terminals abruptly also makes a certain leap, but then rises gradually to the final value $E_0$.

Owing to the interposition of such a network, the variation of the control-grid voltage of the tube I changes and passes into the variation shown in Fig. 2d, which shows that after the negative maximum the grid voltage does not immediately fall back to substantially zero, but returns to zero gradually, so that the screen-grid tube is blocked during the first part of the sweep, with the result that the screen-grid has imposed upon it a much lower load and the total energy used by the circuit-arrangement may be small.

The synchronizing pulses which are supplied to the control-grid of the discharge tube of the circuit-arrangement shown in Fig. 1 need supply even considerably less energy than in the case of the well-known circuit-arrangements, owing to the presence of the grid condenser and the grid leak resistance. The use of the said networks in the control-grid also exhibits the advantage of a still further reduction of this energy, particularly in the use of the network shown in Fig. 6, since this network behaves for the synchronizing pulses as a comparatively high resistance load.

A network as shown in Fig. 6 permits of obtaining, at a sawtooth frequency of 10,125 c./s., the following values for the resistances and the capacity:

$r_1 = 40,000$ ohms, $r_2 = 10,000$ ohms, $C_1 = 1,500$ $\mu\mu$fs

What we claim is:

1. A circuit arrrangement for generating a saw-tooth wave of given frequency, comprising an electron discharge tube having cathode, control grid, screen grid and anode electrodes defining a control grid-cathode circuit and an anode-cathode circuit, a first inductive element connected in the anode-cathode circuit of said tube, a second inductive element connected in the control grid-cathode circuit of said tube and inductively coupled to said first inductive element, a unidirectional conductor having an anode and a cathode, means to couple the cathode of said conductor to the anode of said tube, means to couple the anode of said conductor to the cathode of said tube, a source of direct current potential, means to couple said source to the anode-cathode circuit of said tube, said unidirectional conductor, said source of direct current potential and said first inductive element being coupled together in series with one another, means to apply a positive potential to said screen grid, a capacitive element connected to said control grid and in series with said second inductive element, and a resistive element coupled between the control grid and cathode electrodes of said tube, said resistive element and said capacitive element in combination having a time constant longer than the period of said saw-tooth wave.

2. A circuit arrangement for generating a saw-tooth wave of given frequency, comprising an electron discharge tube having cathode, control grid, screen grid and anode electrodes defining a control grid-cathode circuit and an anode-cathode circuit, a first inductive element connected in the anode-cathode circuit of said tube, a second inductive element connected in the control grid-cathode circuit of said tube and inductively coupled to said first inductive element, a unidirectional conductor having an anode and a cathode, means to couple the cathode of said conductor to the anode of said tube, means to couple the anode of said conductor to the cathode of said tube, a source of direct current potential, means to couple said source to the anode-cathode circuit of said tube, said unidirectional conductor, said source of direct current potential and said first inductive element being coupled together in series with one another, means to apply a positive potential to said screen grid, a capacitive element connected to said control grid and in series with said second inductive element, and a resistive element coupled between the control grid and cathode electrodes of said tube, said resistive element and said capacitive element in combination having a time constant longer than the period of said saw-tooth wave, and a frequency discriminating network in said control grid-cathode circuit, said frequency discriminating network attenuating frequencies higher than said given frequency.

3. A circuit arrangement for generating a saw-tooth wave of given frequency, comprising an electron discharge tube having cathode, control grid, screen grid and anode electrodes defining a control grid-cathode circuit and an anode-cathode circuit, a first inductive element having a tap, means to couple said tap to the anode of said tube, a second inductive element connected in the control grid-cathode circuit of said tube and inductively coupled to said first inductive element, a source of direct current potential, means to couple said source in the anode-cathode circuit of said tube between the cathode and one end of said first inductive element, means to apply a positive potential to said screen grid, a unidirectional conductor having a cathode and an anode, means to couple the anode of said conductor to the cathode of said tube, means to couple the cathode of said conductor to the other end of said first inductive element, said unidirectional conductor, said source of direct current potential and said first inductive element being coupled in series with one another, a capacitive element connected to said control grid and in series with said second inductive element, and a resistive element coupled between the control grid and cathode electrodes of said tube, said resistive element and said capacitive element in combination having a time constant longer than the period of said saw-tooth wave.

4. A circuit arrangement for generating a saw-tooth wave of given frequency, comprising an electron discharge tube having cathode, control grid, screen grid and anode electrodes defining a control grid-cathode circuit and an anode-cathode circuit, a first inductive element having a tap, means to couple said tap to the anode of said tube, a second inductive element connected in the control grid-cathode circuit of said tube and inductively coupled to said first inductive element, a source of direct current potential, means to couple said source in the anode-cathode circuit of said tube between the cathode and one end of said first inductive element, means to apply a positive potential to said screen grid, a unidirectional conductor having a cathode and an anode, means to couple the anode of said conductor to the cathode of said tube, means to couple the cathode of said conductor to the other end of said first inductive element, said unidirectional conductor, said source of direct current potential and said first inductive element being coupled in series with one another, a capacitive element connected to said control grid and in series with said second inductive element, and a resistive element coupled between the control grid and cathode electrodes of said tube, said resistive element and said capacitive element in combination having a time constant longer than the period of said sawtooth wave, and a frequency discriminating network in said control grid-cathode circuit, said frequency discriminating network attenuating frequencies higher than said given frequency.

JOHAN HAANTJES.
JOSUÉ JEAN PHILIPPE VALETON.

REFERENCES CITED

The following references are of record in the file of this patent:

UNITED STATES PATENTS

| Number    | Name    | Date          |
|-----------|---------|---------------|
| 2,143,366 | Andrieu | Jan. 10, 1939 |
| 2,265,620 | Bahring | Dec. 9, 1941  |